(12) United States Patent
Golan (10) Patent No.: US 10,087,969 B2
(45) Date of Patent: Oct. 2, 2018

(54) BLIND RIVET

(71) Applicant: Ornit Agriculture Industry Business And Management Agricultural Cooperative Association Ltd., D.N. Hof Ashkelon (IL)

(72) Inventor: Yaakov Golan, D.N. Hof Ashkelon (IL)

(73) Assignee: ORNIT AGRICULTURE INDUSTRY BUSINESS AND MANAGEMENT AGRICULTURAL COOPERATIVE ASSOCIATION LTD., D.N. Hof Ashkelon (IL)

( * ) Notice: Subject to any disclaimer, the term of this patent is extended or adjusted under 35 U.S.C. 154(b) by 205 days.

(21) Appl. No.: 14/778,840

(22) PCT Filed: May 2, 2013

(86) PCT No.: PCT/IL2013/050378
§ 371 (c)(1),
(2) Date: Sep. 21, 2015

(87) PCT Pub. No.: WO2014/178036
PCT Pub. Date: Nov. 6, 2014

(65) Prior Publication Data
US 2016/0047407 A1    Feb. 18, 2016

(51) Int. Cl.
*F16B 19/10*    (2006.01)
*B21J 15/04*    (2006.01)
*B21J 15/02*    (2006.01)

(52) U.S. Cl.
CPC ......... *F16B 19/1054* (2013.01); *B21J 15/022* (2013.01); *B21J 15/043* (2013.01); *B21J 15/045* (2013.01)

(58) Field of Classification Search
CPC .... F16B 19/1054; B21J 15/022; B21J 15/043; B21J 15/045
See application file for complete search history.

(56) References Cited

U.S. PATENT DOCUMENTS

| | | |
|---|---|---|
| 2,030,167 A | 2/1936 | Miller |
| 2,030,168 A | 2/1936 | Miller |
| 2,030,169 A | 2/1936 | Huck |
| RE20,055 E | 8/1936 | Huck |

(Continued)

FOREIGN PATENT DOCUMENTS

| | | |
|---|---|---|
| DE | 2625023 A1 | 12/1976 |
| GB | 1093797 A | 12/1967 |

(Continued)

OTHER PUBLICATIONS

International Search Report and Written Opinon dated Aug. 6, 2013; PCT/IL2013/050378.

(Continued)

*Primary Examiner* — John C Hong
(74) *Attorney, Agent, or Firm* — Ladas & Parry LLP (57) ABSTRACT

A blind rivet including a mandrel having a head and a rivet body surrounding the mandrel adjacent the head, the mandrel including at least one locking region for locking engagement therewith of the rivet body, adjacent the head, a selectably breakable region adjacent the at least one locking region and defining a plurality of breakable locations along the mandrel and a gripping region adjacent the selectably breakable region.

12 Claims, 6 Drawing Sheets

(56) References Cited

U.S. PATENT DOCUMENTS

| | | |
|---|---|---|
| 2,061,628 A | 11/1936 | Huck |
| 3,149,530 A | 9/1964 | Kolec |
| 3,230,818 A | 1/1966 | Siebol |
| 3,286,580 A | 11/1966 | Jeal |
| 3,414,965 A | 12/1968 | Stau et al. |
| 3,515,028 A | 6/1970 | Patton |
| 4,189,977 A | 2/1980 | Hintz et al. |
| 4,222,304 A | 9/1980 | Yoshida et al. |
| 4,309,137 A | 1/1982 | Tanaka et al. |
| 4,639,174 A | 1/1987 | Denham et al. |
| 4,969,785 A | 11/1990 | Wright |
| 5,286,151 A | 2/1994 | Eshraghi |
| 5,503,510 A | 4/1996 | Golan |
| 6,042,313 A | 3/2000 | Dehlke |
| 6,213,699 B1 | 4/2001 | Sadri et al. |
| 6,224,310 B1 | 5/2001 | Summerlin et al. |
| 6,905,296 B2 | 6/2005 | Millington |
| 6,935,821 B2 | 8/2005 | Bodin et al. |
| 7,650,681 B2 | 1/2010 | Jones et al. |
| 7,824,141 B2 | 11/2010 | Jones et al. |
| 7,891,734 B2 | 2/2011 | Humer et al. |
| 7,937,821 B2 | 5/2011 | Jones et al. |
| 7,955,035 B2 | 6/2011 | Singh et al. |
| 8,096,742 B2 | 1/2012 | Davies et al. |
| 8,328,483 B2 | 12/2012 | Jones et al. |
| 8,348,565 B2 | 1/2013 | Khalil et al. |
| 8,366,363 B2 | 2/2013 | Jones et al. |
| 2010/0068001 A1 | 3/2010 | Khalil et al. |
| 2010/0068002 A1 | 3/2010 | Crutchley et al. |
| 2011/0206477 A1 | 8/2011 | Brewer et al. |

FOREIGN PATENT DOCUMENTS

| | | |
|---|---|---|
| GB | 1495592 A | 12/1977 |
| GB | 2157788 A | 10/1985 |
| WO | 2014/178036 A1 | 11/2014 |

OTHER PUBLICATIONS

International Preliminary Report on Patentability dated Nov. 3, 2015; PCT/IL2013/050378.

Extended European Search Report dated Nov. 9, 2016; Appln. No. 13883697.8-1702/2992227 PCT/IL2013050378.

BLIND RIVET

REFERENCE TO RELATED APPLICATIONS

Reference is hereby made to U.S. Pat. No. 5,503,510, the disclosure of which is hereby incorporated by reference.

FIELD OF THE INVENTION

The present invention relates to blind rivets generally.

BACKGROUND OF THE INVENTION

Blind rivets are known for use in various metalworking industries. U.S. Pat. No. 5,503,510 of the present assignee describes a blind rivet which has found acceptance in the marketplace.

The following patent documents were either cited in the prosecution of U.S. Pat. No. 5,503,510 or had U.S. Pat. No. 5,503,510 cited in the prosecution thereof.

U.S. Patent Publication Nos. 2010/0068001; 2010/0068002 and 2011/0206477;

U.S. Pat. Nos. 8,366,363; 8,348,565; 8,328,483; 8,096,742; 7,955,035; 7,937,821; 7,891,734; 7,824,141; 7,650,681; 6,935,821; 6,905,296; 6,224,310; 6,213,699; 5,286,151; 4,969,785; 4,639:174; 4,309,137; 4,222,304; 4189,977; 3,515,028; 3,414,965; 3,286,580; 3,149,530; 2,061,628; RE20,055; 2,030,169; 2,030,168 and 2,030,167; and Foreign Patent Nos.: FR1262601; DE2625023; GB1495592 and GB2157788.

SUMMARY OF THE INVENTION

The present invention seeks to provide an improved blind rivet which is particularly suitable for secure fastening of a relatively wide range of thicknesses of materials. There is thus provided in accordance with a preferred embodiment of the present invention a blind rivet including a mandrel having a head and a rivet body surrounding the mandrel adjacent the head, the mandrel including at least one locking region for locking engagement therewith of the rivet body, adjacent the head, a selectably breakable region adjacent the at least one locking region and defining a plurality of breakable locations along the mandrel and a gripping region adjacent the selectably breakable region.

Preferably, at least part of the selectably breakable region is surrounded by the rivet body and defines an additional locking region for locking engagement therewith of the rivet body as the result of riveting.

In accordance with a preferred embodiment of the present invention the at least one locking region includes a pair of mutually spaced splined portions, each configured for locking engagement with the rivet body.

Preferably, the mandrel at the at least one locking region has an outer diameter which is less an outer diameter of the head.

In accordance with a preferred embodiment of the present invention the gripping region includes a plurality of circumferential grooves. Additionally, a radius of the mandrel at the plurality of circumferential grooves is greater than a radius of the mandrel at the plurality of breakable locations.

In accordance with a preferred embodiment of the present invention, the rivet body includes a generally cylindrical rivet body portion and a grippable portion. Preferably, the rivet body portion defines a first cylindrical bore of circular cross section having a first diameter and a second cylindrical bore of circular cross section having a second diameter and the second diameter is slightly less than the first diameter. Additionally, the grippable portion defines a cylindrical bore of circular cross section of the second diameter.

In accordance with a preferred embodiment of the present invention the rivet body portion includes a first portion having a first thickness and a second portion having a second thickness, greater than the first thickness, and the grippable portion includes a first cylindrical portion having a third thickness, greater than the second thickness and a second cylindrical portion having a fourth thickness, greater than the third thickness.

There is also provided in accordance with another preferred embodiment of the present invention a blind riveting assembly including a blind rivet including a mandrel having a head and a rivet body surrounding the mandrel adjacent the head, the mandrel including at least one locking region for locking engagement therewith of the rivet body, adjacent the head, a selectably breakable region adjacent the at least one locking region and defining a plurality of breakable locations along the mandrel and a gripping region adjacent the selectably breakable region and a riveting tool operative during riveting to engage the gripping region of the mandrel and to linearly pull the mandrel relative to the rivet body and to cause the rivet body to deform into at least first locking engagement with the at least one locking region and into at least additional locking engagement with at least a portion of the selectably breakable region.

Preferably, the riveting tool is operative during riveting to cause a first portion of the rivet body to deform into the at least first locking engagement with the at least one locking region and only thereafter to cause a second portion of the rivet body to deform into the at least additional locking engagement with the at least a portion of the selectably breakable region.

There is further provided in accordance with yet another preferred embodiment of the present invention a method for blind riveting including providing at least two apertured metal plates to be joined, providing a blind rivet and a riveting tool, the blind rivet including a mandrel having a head and a rivet body surrounding the mandrel adjacent the head, the mandrel including at least one locking region for locking engagement therewith of the rivet body, adjacent the head, a selectably breakable region adjacent the at least one locking region and defining a plurality of breakable locations along the mandrel and a gripping region adjacent the selectably breakable region and the riveting tool including a rivet body engaging snout portion and a mandrel gripping region engagement portion, engaging the gripping region of the mandrel with the mandrel gripping region engagement portion, linearly retracting the mandrel gripping region engagement portion relative to the snout portion, thereby pulling the mandrel relative to the rivet body and causing the rivet body to deform in at least first locking engagement with the at least one locking region and subsequently further retracting the mandrel gripping region engagement portion relative to the snout portion, thereby pulling the mandrel relative to the rivet body and causing the rivet body to deform in at least additional locking engagement with at least a portion of the selectably breakable region.

Preferably, the method also includes, subsequent to the further retracting, additionally retracting the mandrel gripping region engagement portion relative to the snout portion, until a sufficient longitudinal tensile force is applied to the mandrel causing the mandrel to break at one of the plurality of selectably breakable locations.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
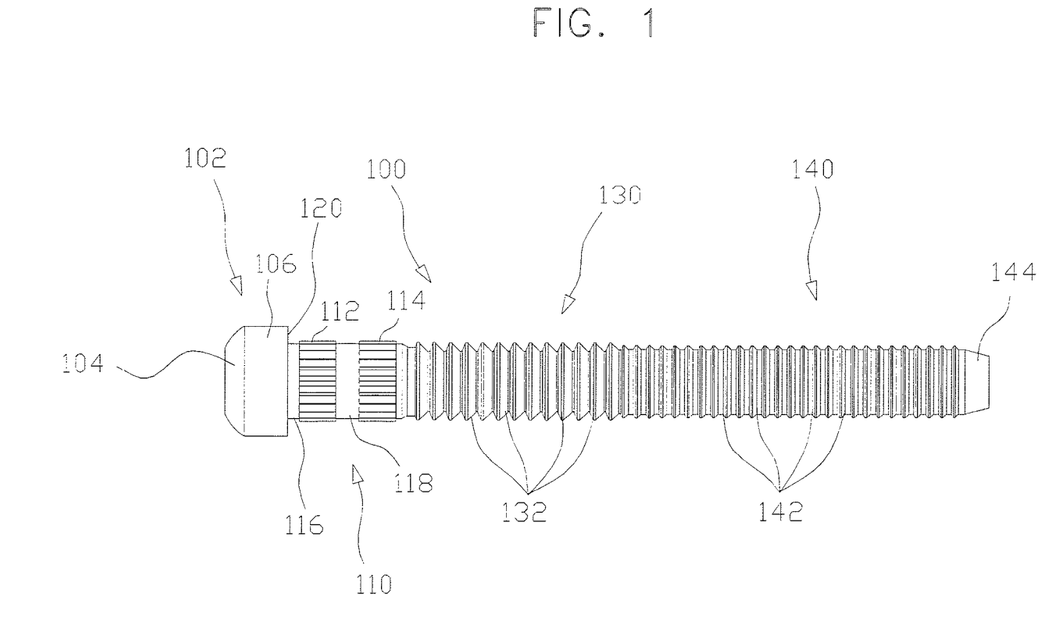
FIG. 1 is a simplified side view illustration of a mandrel forming part of a blind rivet constructed and operative in accordance with a preferred embodiment of the present invention.

Reference is now made to FIG. 1, which is a simplified side view illustration of a mandrel 100 forming part of a blind rivet (FIGS. 3A & 3B) constructed and operative in accordance with a preferred embodiment of the present invention.

Figure 2A:
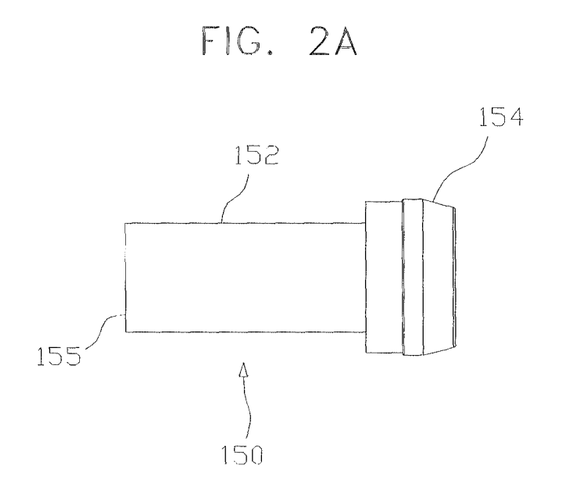
FIGS. 2A and 2B are, respectively, a simplified side view and a simplified sectional illustration of a rivet body forming part of a blind rivet constructed and operative in accordance with a preferred embodiment of the present invention.
Figure 2B:
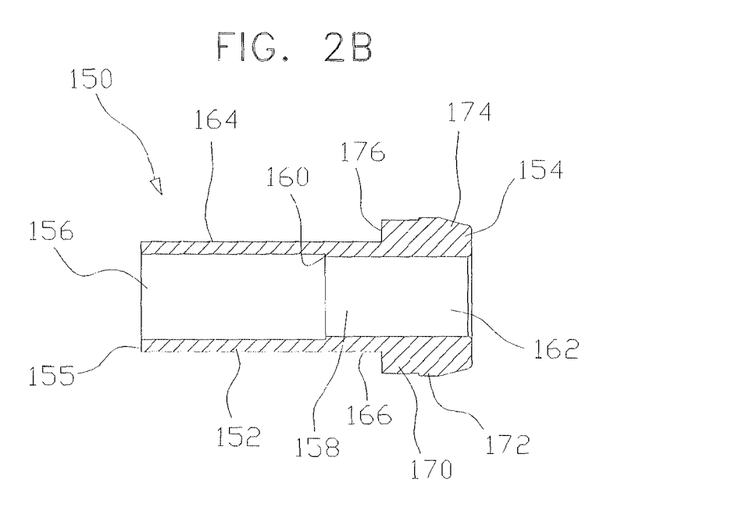

As seen in FIG. 1, mandrel 100 is preferably integrally formed of any suitable metal to have a head portion 102, typically including a tapered tip 104 and a generally cylindrical main head portion 106. Adjacent head portion 102 there extends at least one locking region 110, here including a pair of mutually spaced splined portions 112 and 114 each configured for locking engagement therewith of a rivet body (FIGS. 2A and 2B). Splined portion 112 is separated from head portion 102 by a generally smooth cylindrical portion 116 of generally circular cross section and splined portions 112 and 114 are separated from each other by a generally smooth cylindrical portion 118 of generally circular cross section.

It is appreciated that the at least one locking region 110 as well as the remainder of the mandrel 100 to be described hereinbelow have an outer diameter which is less than that of the head portion 102 and the generally cylindrical main head portion 106 defines a circumferential shoulder 120 therebetween.

Extending from at least one locking region 110 in a direction away from head portion 102 is a selectably breakable region 130, which defines a plurality of breakable locations 132 along the length of the mandrel 100. Here the breakable locations 132 are circumferential grooves of minimized radius and generally circular cross section at which the mandrel 100 is most easily breakable by application of a tensile stress thereat along a longitudinal axis of the mandrel 100. It is a particular feature of the present invention, as distinguished from the prior art, that the selectably breakable region 130 defines a plurality of breakable locations 132 along the length of the mandrel 100 since this enables the mandrel 100 to be useful for a relatively wide range of overall thicknesses of material to be joined thereby.

In the illustrated embodiment, a total of 13 breakable locations 132 are provided, it being appreciated that a suitable greater or lesser plurality of breakable locations 132 may be provided. Extending from the selectably breakable region 130 in a direction away from head portion 102 is a gripping region 140. Gripping region 140 includes a series of circumferential grooves 142 of generally circular cross section and reduced radius, which is nevertheless greater than the minimized thickness of the circumferential grooves of the breakable locations 132 of the breakable region 130. Thus it is appreciated that the tensile strength of the mandrel 100 at the gripping region 140 is significantly greater than the tensile strength of the mandrel 100 at the selectably breakable region 130.

Extending from the gripping region 140 is preferably a tapered, generally truncated conical end 144.

Reference is now made to FIGS. 2A and 2B, which are, respectively, a simplified side view and a simplified sectional illustration of a rivet body 150 forming part of the blind rivet (FIGS. 3A and 3B) constructed and operative in accordance with a preferred embodiment of the present invention.

As seen in FIGS. 2A and 2B, the rivet body 150 is integrally formed of a suitable metal to include a generally cylindrical rivet body portion 152 and a grippable portion 154. Rivet body portion 152 is formed along most of its length from an end 155 facing away from grippable portion 154 with a generally cylindrical bore 156 of generally circular cross section of a first diameter followed by a generally cylindrical bore 158 of generally circular cross section of a second diameter, slightly less than the first diameter. As seen in FIG. 2B, bores 156 and 158 are separated by a shoulder 160.

Grippable portion 154 is formed with a generally cylindrical bore 162 of generally circular cross section of the second diameter, which is a continuation of bore 158.

It is appreciated from a consideration of FIG. 2B that most of the rivet body portion 152, namely that portion, designated by reference numeral 164, which surrounds bore 156 has a first thickness and a portion, designated by reference numeral 166, of the rivet body portion 152 which surrounds bore 158 has a second thickness, greater than the first thickness. It is also seen that the grippable portion 154 includes a first generally cylindrical portion 170 of a third thickness, significantly greater than the second thickness; a second generally cylindrical portion 172 of a fourth thickness, slightly greater than the third thickness, and a tapered truncated conical portion 174. The junction of cylindrical portion 170 of grippable portion 154 and portion 166 defines a shoulder 176.

Figure 3A:
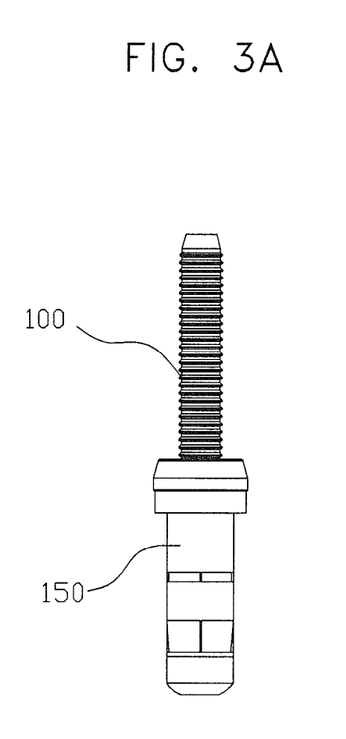
FIGS. 3A and 3B are, respectively, a simplified side view and a simplified sectional illustration of a blind rivet constructed and operative in accordance with a preferred embodiment of the present invention.
Figure 3B:
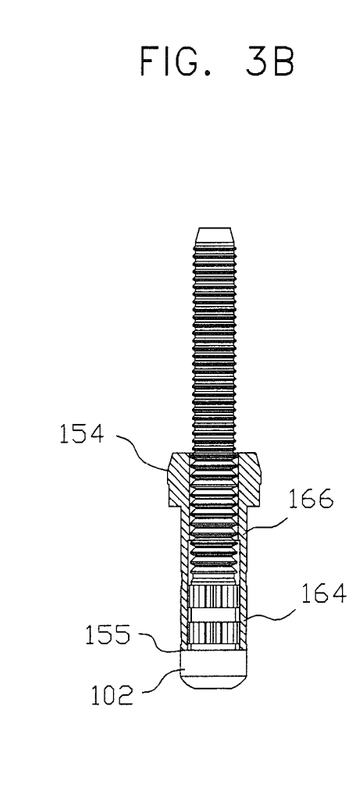

Reference is now made to FIGS. 3A and 3B, which are, respectively, a simplified side view and a simplified sectional illustration of a blind rivet constructed and operative in accordance with a preferred embodiment of the present invention. The blind rivet seen in FIGS. 3A & 3B is in the form that it is supplied to users and illustrates the rivet body 150 surrounding part of the mandrel 100 in a mutual press fit arrangement.

Specifically, end 155 of rivet body 150 lies up against shoulder 120 defined by head portion 102 of mandrel 100. Portion 164 of rivet body 150 surrounds the at least one locking region 110 and part of the selectably breakable region 130 of the mandrel 100 and portion 166 of rivet body 150 surrounds an intermediate portion of the selectably breakable region 130. Grippable portion 154 of the rivet body 150 surrounds the remainder of the selectably breakable region 130 and preferably extends just up to the gripping region 140 of the mandrel 100.

Figure 4A:
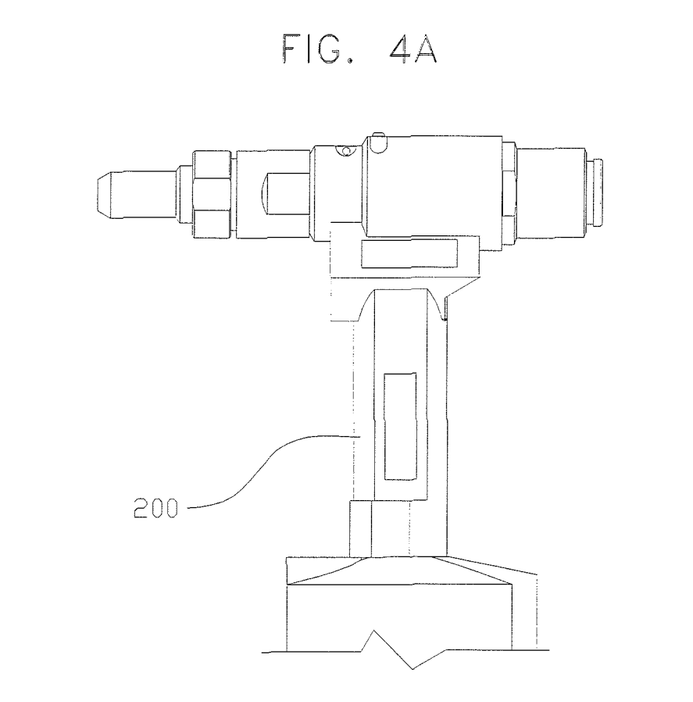
FIGS. 4A and 4B are, respectively, a simplified side view and a simplified sectional illustration of a riveting tool useful in connection with the blind rivet constructed and operative in accordance with a preferred embodiment of the present invention.
Figure 4B:
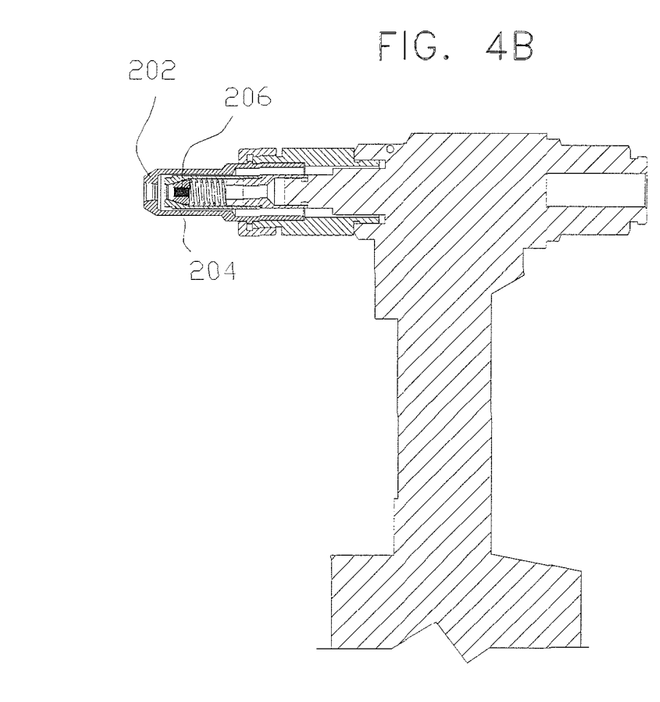

Reference is now made FIGS. 4A and 4B, which are, respectively, a simplified side view and a simplified sectional illustration of a riveting tool 200 useful in connection with the blind rivet constructed and operative in accordance with a preferred embodiment of the present invention. The riveting tool 200 is preferably based on any pneumatic or hydraulic chassis which provides selectable axial displacement between an internally tapered, rivet body engaging snout portion 202 and a mandrel gripping region engagement portion 204 inside which is provided an insert portion 206 which is configured to have grooves corresponding to those on gripping region 140 for tight engagement therewith.

Reference is now made to FIGS. 5A, 5B, 5C, 5D, 5E and 5F, which are simplified illustrations of various stages in the operation of the riveting tool of FIGS. 4A & 4B and the blind rivet of FIGS. 1-3B.

Figure 5A:
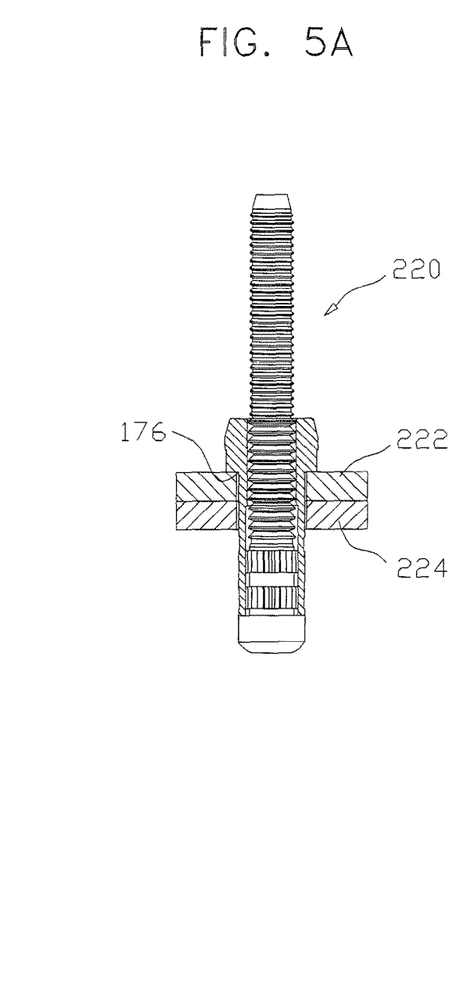
FIGS. 5A, 5B, 5C, 5D, 5E and 5F are simplified illustrations of various stages in the operation of the riveting tool of FIGS. 4A & 4B and the blind rivet of FIGS. 1-3B.

FIG. 5A shows the blind rivet of FIGS. 3A & 3B, here designated by reference numeral 220, extending through apertures formed in a pair of metal plate portions 222 and 224 to be joined by riveting. It is appreciated that, while in the illustrated embodiment two metal plate portions are shown, more than two metal plates may also be joined. It is seen that shoulder 176 lies up against a facing surface of metal plate portion 222 and that the apertures formed in metal plate portions 222 and 224 have a diameter just slightly greater than the outer diameter of portion 166 of rivet body 150. The longitudinal extent of portion 166 is preferably, but need not necessarily be, generally the same as the combined thickness of the metal plate portions 222 and 224 that are being joined. It is a particular feature of the invention that the longitudinal extent of portion 166 may be less than the thickness of the metal plate portions 222 and 224 that are being joined.

Figure 5B:
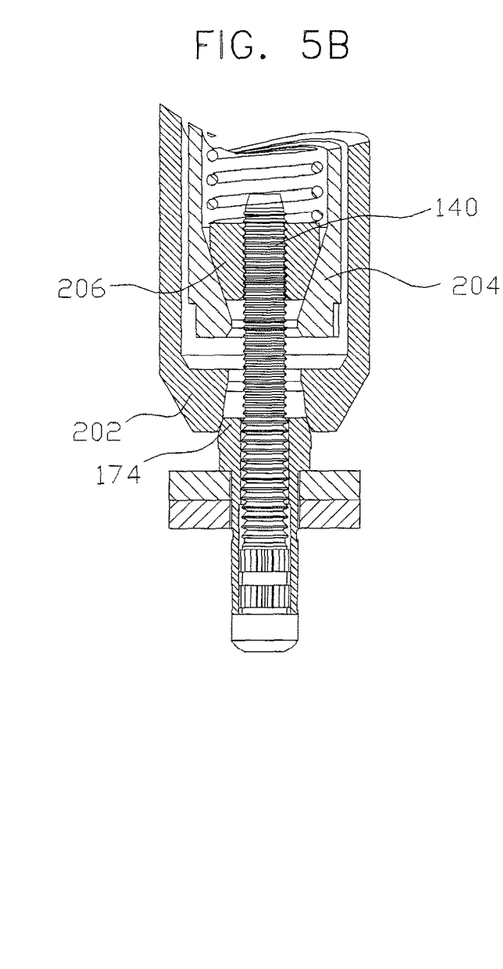

Turning now to FIG. 5B, it is seen that tapered truncated conical portion 174 of the rivet body 150 is engaged by a corresponding tapered internal surface of snout portion 202 of tool 200 and gripping region 140 of mandrel 100 is tightly engaged by a correspondingly grooved insert portion 206 retained in mandrel gripping region engagement portion 204 of tool 200.

Figure 5C:
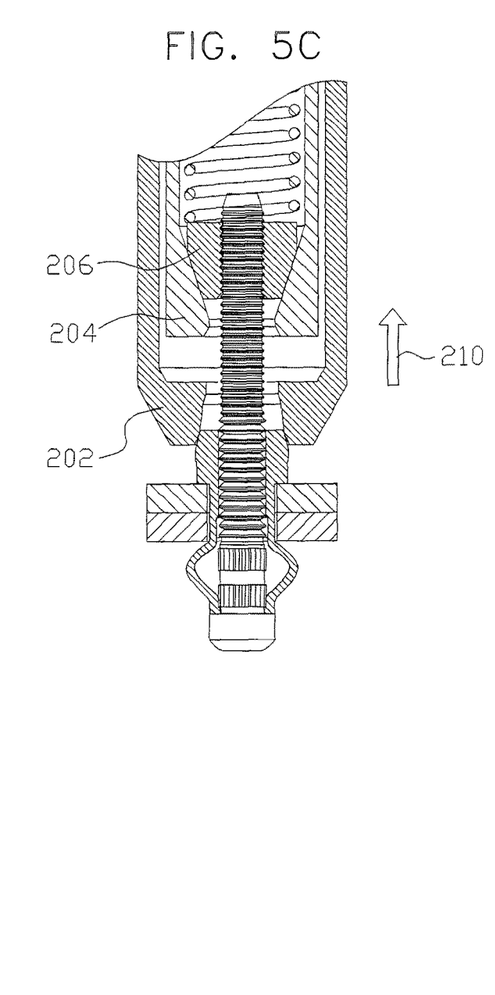

FIG. 5C shows retraction of mandrel gripping region engagement portion 204 of tool 200, and thus of insert portion 206, relative to snout portion 202, in a direction indicated by an arrow 210, which is upward facing in the sense of FIGS. 5A-5F. As seen in FIG. 5C, this retraction pulls mandrel 100 in the direction of arrow 210 against the rivet body 150 which is retained in its position by snout portion 202 resulting in deformation of portion 164 of rivet body 150.

Figure 5D:
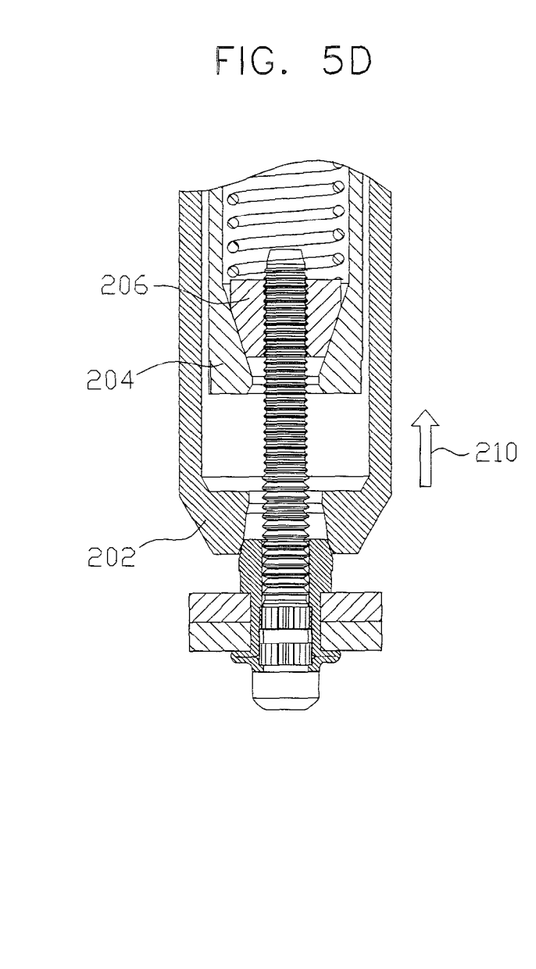

FIG. 5D shows further retraction of mandrel gripping region engagement portion 204 of tool 200, and thus of insert portion 206, relative to snout portion 202, in a direction indicated by arrow 210. As seen in FIG. 5D, this retraction pulls mandrel 100 further in the direction of arrow 210 against the rivet body 150 which is retained in its position by snout portion 202 resulting in further deformation and flattening of portion 164 of rivet body 150 against metal plate portion 224, thus tightly joining metal plate portions 222 and 224 between flattened portion 164 and shoulder 176 defined by the grippable portion 154 of the rivet body 150.

Figure 5E:
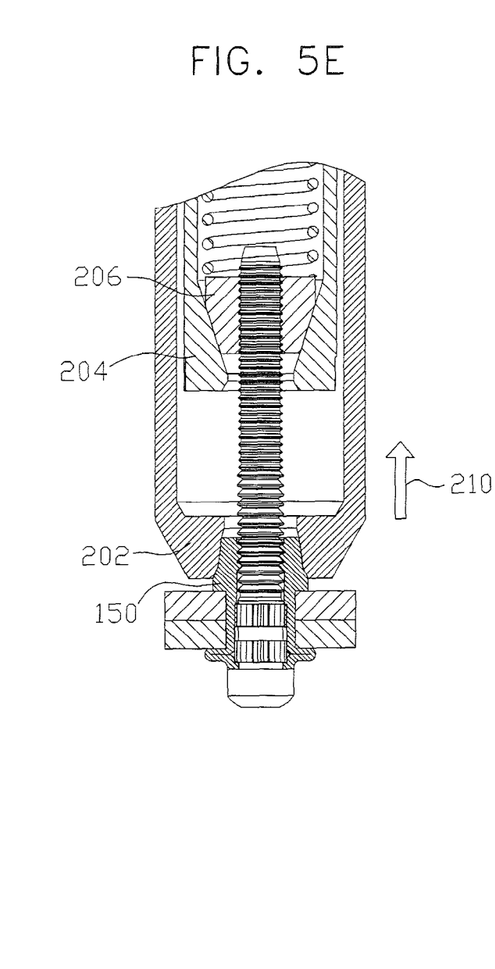

FIG. 5E shows still further retraction of mandrel gripping region engagement portion 204 of tool 200, and thus of insert portion 206, relative to snout portion 202, in a direction indicated by arrow 210. As seen in FIG. 5E, this retraction pulls grippable portion 154 of the rivet body 150 further into engagement with snout portion 202, forcing and deforming the bore 162 of grippable portion 154 into intimate engagement with some, but typically not all of, the grooves defined by the selectably breakable region 130. It is a particular feature of the present invention that in this way at least part of the selectably breakable region 130 is surrounded by the rivet body 150 and functions as an additional locking region for locking engagement between the mandrel 100 and the rivet body 150 as the result of riveting.

Figure 5F:
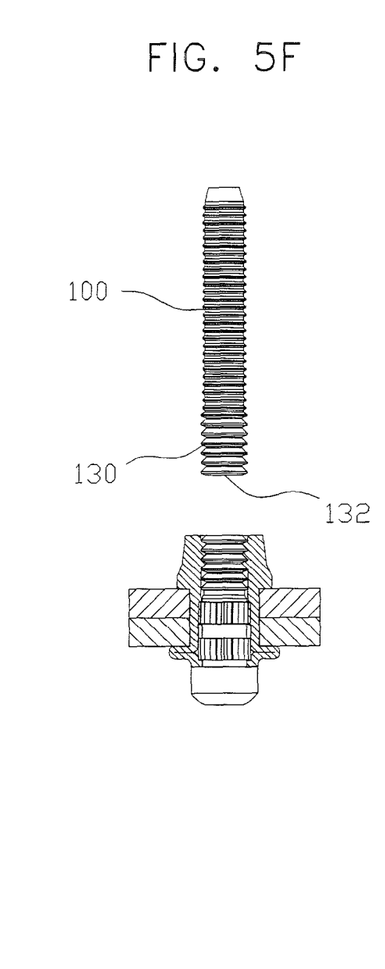

The retraction continues until a sufficient longitudinal tensile force is applied to the mandrel 100 so as to break the mandrel 100 at a selectably breakable location 132 in the selectably breakable region 130, as seen in FIG. 5F. The broken off portion of the mandrel 100 may be discarded or recycled.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A blind rivet comprising:
    a mandrel having a head; and
    a rivet body surrounding said mandrel adjacent said head, said mandrel including:
        at least one locking region for locking engagement therewith of said rivet body, adjacent said head;
        a selectably breakable region adjacent said at least one locking region and defining a plurality of breakable locations along said mandrel; and
        a gripping region adjacent said selectably breakable region, said gripping region being immediately contiguous with said selectably breakable region and extending from said selectably breakable region in a direction away from said head; and
    said rivet body including:
        a generally cylindrical rivet body portion comprising:
            a first portion having a first thickness, said first portion being deformable; and
            a second portion having a second thickness, greater than said first thickness; and
        a grippable portion comprising:
            a first cylindrical portion having a third thickness, greater than said second thickness; and
            a second cylindrical portion having a fourth thickness, greater than said third thickness.

2. A blind rivet according to claim 1 and wherein at least part of said selectably breakable region is surrounded by said rivet body and defines an additional locking region for locking engagement therewith of said rivet body as the result of riveting.

3. A blind rivet according to claim 1 and wherein said at least one locking region comprises a pair of mutually spaced splined portions, each configured for locking engagement with said rivet body.

4. A blind rivet according to claim 1 and wherein said mandrel at said at least one locking region has an outer diameter which is less an outer diameter of said head.

5. A blind rivet according to claim 1 and wherein said gripping region includes a plurality of circumferential grooves.

6. A blind rivet according to claim 5 and wherein a radius of said mandrel at said plurality of circumferential grooves is greater than a radius of said mandrel at said plurality of breakable locations.

7. A blind rivet according to claim 1 and wherein:
said rivet body portion defines:
a first cylindrical bore of circular cross section having a first diameter; and
a second cylindrical bore of circular cross section having a second diameter; and
said second diameter is slightly less than said first diameter.

8. A blind rivet according to claim 7 and wherein said grippable portion defines a cylindrical bore of circular cross section of said second diameter.

9. A blind riveting assembly comprising:
a blind rivet comprising:
a mandrel having a head; and
a rivet body surrounding said mandrel adjacent said head,
said mandrel including:
at least one locking region for locking engagement therewith of said rivet body, adjacent said head;
a selectably breakable region adjacent said at least one locking region and defining a plurality of breakable locations along said mandrel; and
a gripping region adjacent said selectably breakable region, said gripping region being immediately contiguous with said selectably breakable region and extending from said selectably breakable region in a direction away from said head; and
said rivet body including:
a generally cylindrical rivet body portion comprising:
a first portion having a first thickness, said first portion being deformable; and
a second portion having a second thickness, greater than said first thickness; and
a grippable portion comprising:
a first cylindrical portion having a third thickness, greater than said second thickness; and
a second cylindrical portion having a fourth thickness, greater than said third thickness; and
a riveting tool operative during riveting to engage said gripping region of said mandrel and to linearly pull said mandrel relative to said rivet body and to cause said rivet body to deform into at least first locking engagement with said at least one locking region and into at least additional locking engagement with at least a portion of said selectably breakable region.

10. A blind riveting assembly according to claim 9 and wherein said riveting tool is operative during riveting to cause a first portion of said rivet body to deform into said at least first locking engagement with said at least one locking region and only thereafter to cause a second portion of said rivet body to be deform into said at least additional locking engagement with said at least a portion of said selectably breakable region.

11. A method for blind riveting comprising:
providing at least two apertured metal plates to be joined;
providing a blind rivet and a riveting tool, said blind rivet including a mandrel having a head and a rivet body surrounding said mandrel adjacent said head, said mandrel including at least one locking region for locking engagement therewith of said rivet body, adjacent said head, a selectably breakable region adjacent said at least one locking region and defining a plurality of breakable locations along said mandrel and a gripping region adjacent said selectably breakable region, said gripping region being immediately contiguous with said selectably breakable region and extending from said selectably breakable region in a direction away from said head, said rivet body including a generally cylindrical rivet body portion comprising a first portion having a first thickness, said first portion being deformable and a second portion having a second thickness, greater than said first thickness and a grippable portion comprising a first cylindrical portion having a third thickness, greater than said second thickness and a second cylindrical portion having a fourth thickness, greater than said third thickness; and said riveting tool including a rivet body engaging snout portion and a mandrel gripping region engagement portion;
engaging said gripping region of said mandrel with said mandrel gripping region engagement portion;
linearly retracting said mandrel gripping region engagement portion relative to said snout portion, thereby pulling said mandrel relative to said rivet body and causing said rivet body to deform in at least first locking engagement with said at least one locking region; and
subsequently further retracting said mandrel gripping region engagement portion relative to said snout portion, thereby pulling said mandrel relative to said rivet body and causing said rivet body to deform in at least additional locking engagement with at least a portion of said selectably breakable region.

12. A method according to claim 11 and also comprising, subsequent to said further retracting, additionally retracting said mandrel gripping region engagement portion relative to said snout portion, until a sufficient longitudinal tensile force is applied to said mandrel causing said mandrel to break at one of said plurality of selectably breakable locations.

* * * * *